(12) United States Patent  (10) Patent No.: US 8,953,464 B2
Sun et al.  (45) Date of Patent: Feb. 10, 2015

(54) SYSTEMS, METHODS, AND COMPUTER PROGRAM PRODUCTS FOR COMPENSATING FOR INTERFERENCE IN SECTOR TRANSMISSIONS

(75) Inventors: Jing Sun, San Diego, CA (US); Qiang Wu, San Diego, CA (US); Rashid Ahmed Akbar Attar, San Diego, CA (US); Mehmet I. Gurelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 12/776,493

(22) Filed: May 10, 2010

(65) Prior Publication Data

US 2011/0275380 A1  Nov. 10, 2011

(51) Int. Cl.
*H04B 7/204* (2006.01)
*H04L 25/03* (2006.01)

(52) U.S. Cl.
CPC .................. *H04L 25/03006* (2013.01)
USPC ............ 370/252; 370/336; 370/442; 370/459

(58) Field of Classification Search
USPC ......... 370/241, 252, 321, 336, 337, 442, 458, 370/459; 455/450, 452.2, 513
See application file for complete search history.

(56) References Cited

U.S. PATENT DOCUMENTS

| 5,706,283 | A | 1/1998 | Suzuki |
| 6,067,292 | A | 5/2000 | Huang et al. |
| 6,661,832 | B1 | 12/2003 | Sindhushayana et al. |
| 6,834,194 | B2 | 12/2004 | Hunzinger |
| 6,975,671 | B2 | 12/2005 | Sindhushayana et al. |
| 7,069,037 | B2 | 6/2006 | Lott et al. |
| 7,308,280 | B2 * | 12/2007 | Huh et al. ...................... 455/522 |
| 7,321,563 | B2 * | 1/2008 | Kim et al. ..................... 370/252 |

(Continued)

FOREIGN PATENT DOCUMENTS

| JP | 07038488 | 2/1995 |
| JP | 2008028711 A | 2/2008 |

(Continued)

OTHER PUBLICATIONS

Rodrigues et al., QoS and Load Management via Admission Control in UMTS Forward Lin, Wireless Telecommunications Research Group—GTEL/Federal University of Ceara, Fortaleza, Brazil, 2004 IEEE, pp. 2425-2429.

(Continued)

*Primary Examiner* — Yemane Mesfin
*Assistant Examiner* — Mon Cheri Davenport
(74) *Attorney, Agent, or Firm* — Jeffrey Jacobs

(57) ABSTRACT

A method for interference cancellation in a device that receives transmissions from multiple sources is disclosed. The method includes receiving multiple slots, each including a pilot segment and a traffic segment. A first one of the slots includes information indicating an activity level of a traffic segment of the first one of the slots. The method also includes calculating a value associated with interference among the plurality of slots, utilizing the information indicating the activity level to account for an amount of interference attributable to the first one of the slots. Furthermore, channel conditions are estimated for a second one of the slots using the value associated with the amount of interference. The method also includes processing the second one of the slots according to the estimated channel conditions.

15 Claims, 5 Drawing Sheets

(56) References Cited

U.S. PATENT DOCUMENTS

| | | |
|---|---|---|
| 7,428,263 B2 | 9/2008 | Rouphael et al. |
| 2006/0245510 A1* | 11/2006 | Oketani .................. 375/260 |
| 2007/0040704 A1* | 2/2007 | Smee et al. ............... 340/981 |
| 2010/0067421 A1* | 3/2010 | Gorokhov et al. .......... 370/311 |

FOREIGN PATENT DOCUMENTS

| | | |
|---|---|---|
| JP | 2010028832 A | 2/2010 |
| WO | WO2005071867 | 8/2005 |

OTHER PUBLICATIONS

Anritsu: "Practical Tips on cdma2000 1xEV-DO Forward-Link Movement", Mar. 1, 2007, XP002633223, Retrieved from the Internet: URL:http://downloadfile.anritsu.com/RefFiles/en-US/Services-Support/Downloads/Application-Notes/Application-Note/11410-00379.pdf [retrieved on Apr. 15, 2011].

International Search Report and Written Opinion—PCT/US2010/034329—ISA/EPO—Apr. 29, 2011.

Taiwan Search Report—TW099115180—TIPO—Mar. 19, 2013.

* cited by examiner

SYSTEMS, METHODS, AND COMPUTER PROGRAM PRODUCTS FOR COMPENSATING FOR INTERFERENCE IN SECTOR TRANSMISSIONS

TECHNICAL FIELD

The present description is related, in general, to wireless communication techniques for compensating for interference in sector transmissions and, more specifically, to techniques for compensating for interference that take into account whether a given transmission is idle with respect to traffic.

BACKGROUND

FIG. 1 shows a conventional spatial arrangement of a mobile device 101 and two base stations 102, 103. Each of the base stations 102, 103 transmits and receives in 360 degrees. For each base station, the 360-degree directionality may be divided into three 120-degree sectors. The mobile device 101 is located in a position such that it receives signals from both base stations 102, 103. In other words, the mobile device 101 receives transmissions from at least one of the sectors of each of the base stations 102, 103.

In the arrangement shown in FIG. 1, forward-link transmissions (from the base stations 102, 103 to the mobile device 101) are data streams divided into frames. The frames are further divided into time slots. The time slots have pilot segments and traffic segments. In 3G and 4G data transmission systems, pilot and traffic transmissions are orthogonally multiplexed together, as shown in FIGS. 2 and 3, which show a fully loaded ("active") and idle half slot in cdma2000 EV-DO, respectively.

Sector transmissions are synchronized, i.e., pilots from different sectors interfere with each other, and traffic transmissions from different sectors interfere with each other. In the arrangement shown in FIG. 3, not all traffic segments in the forward link are occupied. Thus, whereas pilot segments in the slots are always occupied, some traffic segments can be empty. The pilot segments are used to estimate channel states that are expected to be experienced by the traffic segments, and channel state estimation often includes estimation of interference. However, for a given signal, the channel state measurements during a pilot segment may be somewhat different than the channel state experienced during the traffic transmission when one or more interfering signals have empty traffic segments. Accordingly, conventional traffic interference estimations based upon pilot signals may not be optimally precise when some sectors in interfering signals are less than fully loaded.

BRIEF SUMMARY

According to one embodiment, a method for interference cancellation in a device that receives transmissions from multiple sources is disclosed. The method includes receiving multiple slots, each including a pilot segment and a traffic segment. A first one of the slots includes information indicating an activity level of a traffic segment of the first one of the slots. The method also includes calculating a value associated with interference among the plurality of slots, utilizing the information indicating the activity level to account for an amount of interference attributable to the first one of the slots. Furthermore, channel conditions are estimated for a second one of the slots using the value associated with the amount of interference. The method also includes processing the second one of the slots according to the estimated channel conditions.

According to one embodiment, an access terminal that receives transmissions from a plurality of sources is disclosed. The access terminal includes a first functional unit that receives a plurality of signals. Each of the signals includes a pilot segment and a traffic segment, and a first one of the signals has information indicative of an existing state of a traffic segment of the first one of the signals. The access terminal also includes a second functional unit that estimates channel conditions for a second one of the signals by utilizing the information indicating the activity level to account for an amount of interference attributable to the first one of the signals. The access terminal also has a third functional unit that recovers information from the second one of the signals using the estimated channel conditions.

According to another embodiment, a computer program product having a computer readable medium tangibly recording computer program logic for interference cancellation in a device that receives transmissions from a plurality of sources is disclosed. The computer program product includes code that receives a plurality of slots, each of the slots including a pilot segment and a traffic segment. A first one of the slots includes information indicating an activity level of a traffic segment of the first one of the slots. The computer program product also has code that calculates a value associated with interference among the plurality of slots, utilizing the information indicating the activity level to account for an amount of interference attributable to the first one of the slots. The computer program product has code that estimates channel conditions for a second one of the slots using the value associated with the amount of interference and code that processes the second one of the slots according to the estimated channel conditions.

According to one embodiment, an access terminal that receives transmissions from a plurality of sources is disclosed. The access terminal includes means for receiving a plurality of signals, each of the signals including a pilot segment and a traffic segment. A first one of the signals has information indicating an existing state of a traffic segment of the first one of the signals. The access terminal has means for estimating channel conditions for a second one of the signals by utilizing the information indicating the activity level to account for an amount of interference attributable to the first one of the signals and means for recovering information from the second one of the signals using the estimated channel conditions.

In another embodiment, a method for providing forward link transmissions is disclosed. The method includes transmitting a forward link signal slot-by-slot in which a first subset of the slots are active with respect to traffic and a second subset of the slots are idle with respect to traffic. The transmitting includes inserting into a first one of the slots information regarding an activity level of a traffic segment of the first one of the slots.

A base station providing forward link transmissions is also disclosed. The base station includes a functional unit transmitting a plurality of signals in a forward link in which some of the signals are active with respect to traffic and others of the signals are idle with respect to traffic. The functional unit inserts into a first one of the signals information indicating an existing state of a traffic segment of the first one of the signals.

According to yet another embodiment, a computer program product having a computer readable medium tangibly recording computer program logic for providing forward link transmissions is disclosed. The computer program product includes code that transmits a forward link signal slot-by-slot in which a first subset of the slots are active with respect to traffic and a second subset of the slots are idle with respect to traffic. The code that transmits includes code that inserts into a first one of the slots information regarding an activity level of a traffic segment of the first one of the slots.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 3:
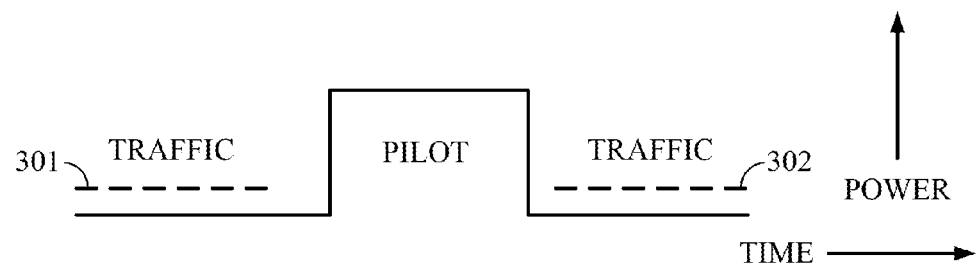

Turning attention to FIG. 3, the idle half slot includes low-power signals 301 and 302 in the traffic segments. The low-power signals 301, 302 are currently used in some systems as a way of adapting the high power amplifiers of the base station to use with slots that can sometimes be idle. Specifically, some base station amplifiers have had difficulty with convergence when a full-power pilot is followed by an idle traffic segment in a forward link transmission. The low-power signals 301, 302 are added to idle traffic segments in some systems in order to aid the operation of the base station amplifiers.

An example low-power signal is the currently-used Idle Mode Gain (IMG) waveform, which is a sequence of zeros spread by a Walsh code and transmitted at about one-twentieth of the power of a pilot or active traffic segment (about 12-14 dB lower). The inventors of the present description have discovered that the signals 301, 302 can be used as indicators of idleness, because the tones 301, 302 are generally reliably detectable by access terminals (e.g., mobile devices).

In the examples below, information indicative of an activity level of a traffic segment is used in the forward link signals. In one example, an IMG waveform is used in an empty traffic segment of a given forward link signal to indicate that the forward link signal is idle (i.e., has no traffic). Surrounding access terminals can use the information indicative of an activity level to estimate channel states more accurately. An IMG waveform is only one example of a activity signal, and various embodiments may employ any signal that can indicate activity or idleness and that is reliably detectable by an access terminal.

In another example a forward link activity channel is added in the forward link signal. From each sector, in each slot, if there is no traffic, a single bit will be transmitted in the proposed channel to be detected by all mobile devices with this sector in the active set. Alternatively, a bit can be added to indicate activity, rather than inactivity, in some embodiments. A receiving device detects the forward link activity bits from all sectors in its active set in each slot. The receiving device can then use the detected bits to estimate channel states more accurately. In yet another example, information indicating activity or idleness is added to a preamble in a forward link transmission. The preamble can then be used to estimate channel states more accurately.

Examples of such embodiments are described in more detail below. Embodiments can be applied in a variety of data transmission techniques, including those associated with Evolution Data Optimized (EVDO), Long Term Evolution (LTE), and the like.

Figure 4:
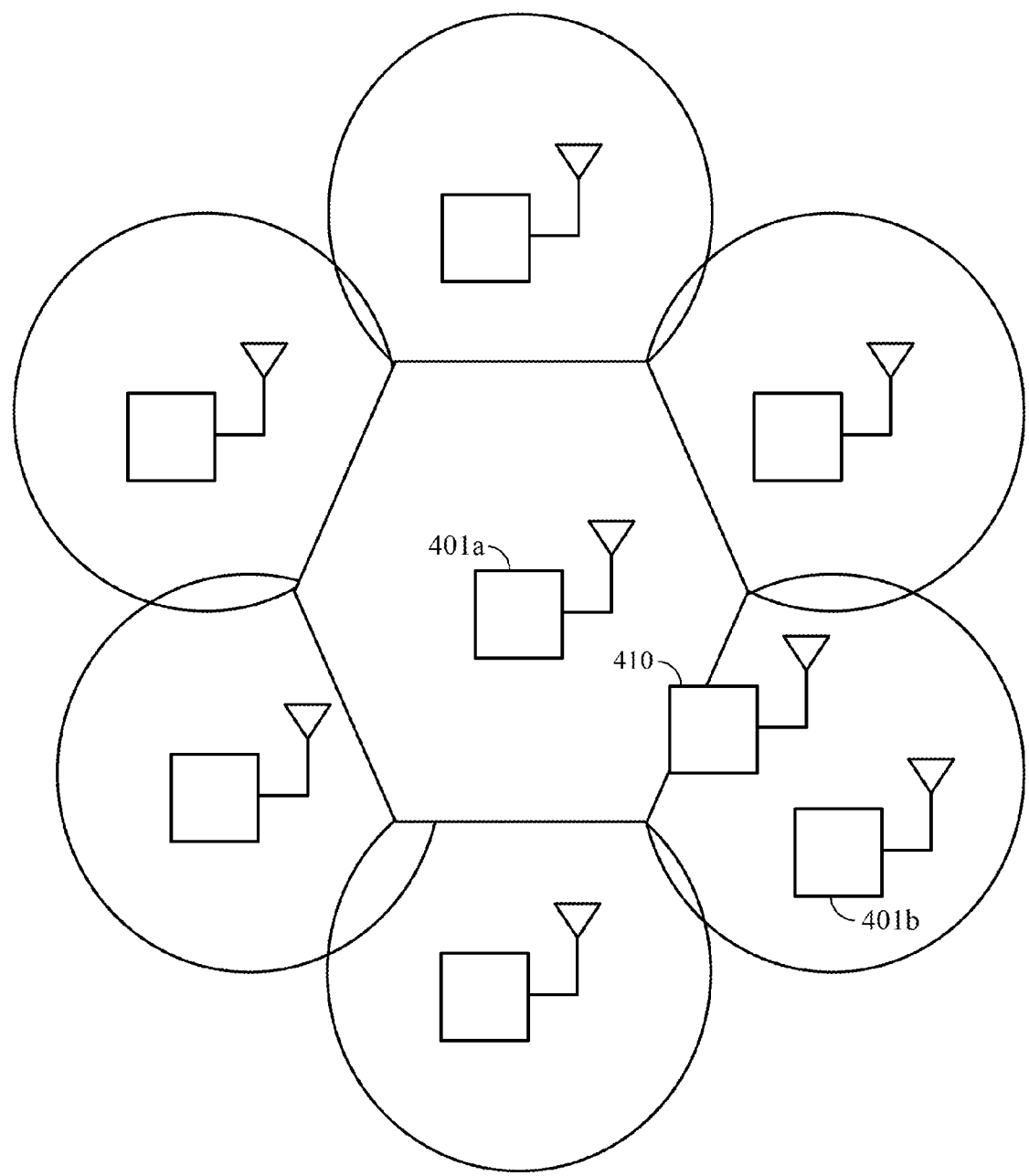
FIG. 4 is an illustration of an exemplary arrangement according to an embodiment of the disclosure.

FIG. 4 is an illustration of an exemplary arrangement according to an embodiment of the disclosure. The arrangement includes an access terminal 410, which may be a cellular phone, a laptop computer, a Personal Digital Assistant (PDA), a stationary device, or the like. The arrangement also includes several base stations, two of which are labeled 401a and 401b. The access terminal 410 is communicating with the base station 401a via an active sector of the base station 401a. Because of its location, the access terminal 410 is also receiving interfering signals from at least one sector of the base station 401b.

Figure 1:
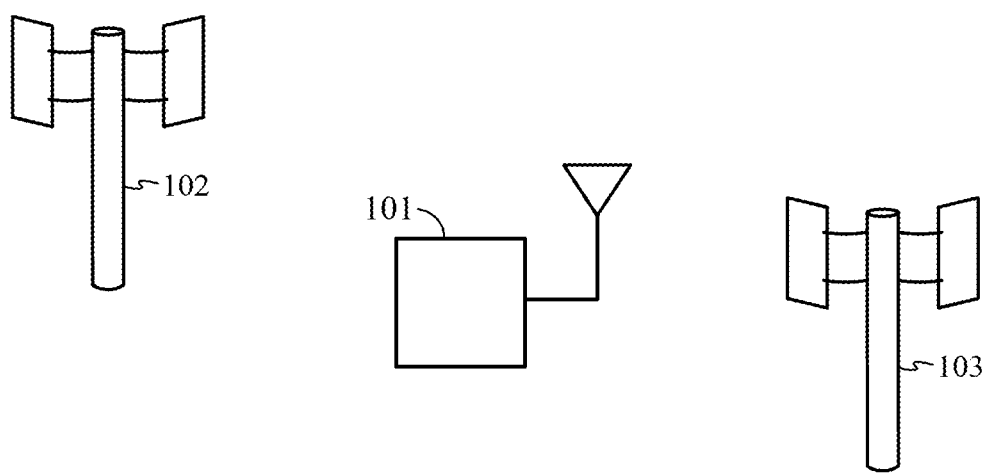
FIG. 1 shows a conventional spatial arrangement of a mobile device and two base stations.
Figure 2:
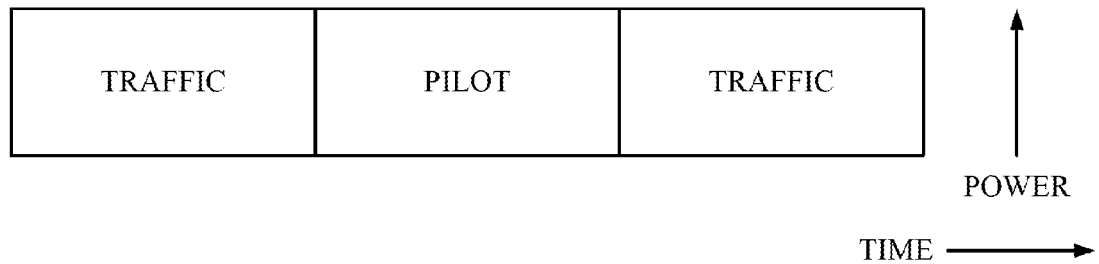
FIGS. 2 and 3 show a loaded and idle half slot, respectively for cdma2000 EV-DO forward link.

The access terminal 410 is different from the conventional access terminal 101 of FIG. 1 because the access terminal 410 is operable to receive information indicative of an instantaneous activity level of a traffic segment of a slot from the base station 401b and to use the information to calculate interference levels for the interfering signal from the base station 401b. The information indicative of activity may include a low-power signal, a preamble, a forward link activity bit, or any other kind of information operable to indicate the activity of a slot.

In a scenario where IMG waveforms are used to indicate inactivity of a traffic segment, in some embodiments, a conventional base station may be used with little or no modification. This is because some conventional base stations currently use IMG waveforms. In a scenario where a forward link activity bit or a preamble is added to the signal to indicate an activity level, hardware and/or software of the base stations 401a, 401b may differ from that of the base stations 102, 103 (FIG. 1) at least in order to add such additional information that is not currently used by conventional base stations.

Figure 5:
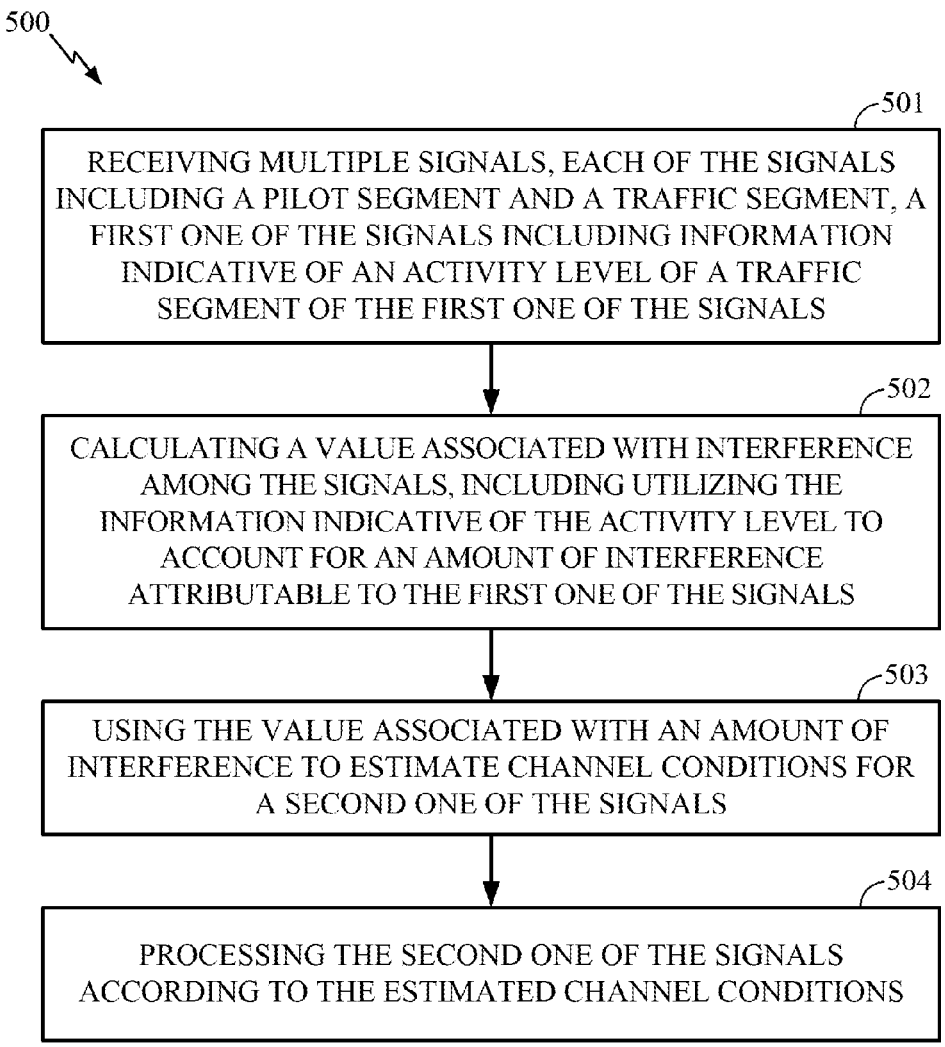
FIG. 5 is an illustration of an exemplary method adapted according to one embodiment of the disclosure.

FIG. 5 is an illustration of an exemplary method 500 adapted according to one embodiment of the disclosure. The method 500 may be performed, for example, by an access terminal that receives forward link signals from two or more sectors.

In block 501, multiple signals are received. Each of the signals includes a pilot segment and a traffic segment, and a first one of the signals includes information indicative of an activity level of a traffic segment thereof. Examples of information indicative of an activity level can include, but are not limited to, a low-power signal, a forward link activity bit, and a preamble. In one example, the signals are slots received from multiple different sectors. The information indicative of an activity level includes instantaneous information about a given transmission and is placed in the given transmission. In another aspect, the information indicative of an activity level is an indication of an existing particular state of an existing, particular transmission. In an example where a transmission is a slot, the information indicative of an activity level applies to the particular slot and is placed in the slot. Such feature is in contrast to the conventional Frame Activity (FAC) bit used in some systems, where the FAC bit is sent ahead of the particular communication to which it refers (i.e., is not instantaneous), refers to the average across a longer period of time rather than to a slot, and is a predictive average rather than an indication of an existing, particular state.

In block 502, a value associated with interference among the signals is calculated. The value is calculated by using the information indicative of the activity level to account for an amount of interference attributable to the first one of the signals. In a scenario where the first one of the signals is idle with respect to traffic, the contribution of the first one of the signals to the interference calculation can be handled accordingly. In some embodiments, the weight given to a signal that is idle may be assigned to be relatively low or even zeroed out when calculating interference. Thus, in embodiments that calculate interference source-by-source, an interference source associated with an idle traffic segment can be disregarded or given a lower weight in the interference calculating algorithm. Such technique may give more accurate interference estimations when traffic is idle than conventional techniques.

In block 503, channel conditions are estimated for a second one of the signals using the value associated with the amount of interference. In one example, an access terminal is communicating with a base station over a link that includes the second one of the signals. In estimating channel conditions of the second one of the signals, the access terminal uses the interference estimate attributable to the first one of the signals.

In block 504, the second one of the signals is processed according to the estimated channel conditions. For instance, in various systems, including OFDM systems, a receiver estimates channel conditions to accurately recover the transmitted contents. Processing the second one of the signals may include estimating the channel conditions, decoding and demodulating the second one of the signals and its contents, and presenting the contents in a humanly-perceptible form (e.g., audible sounds, text or pictures on a screen).

Estimating interference and channel conditions, as in FIG. 5, can be performed in any suitable manner, and the scope of embodiments is not limited to any particular technique for estimating interference and channel conditions. In one example, an interference covariance matrix is reconstructed for a desired traffic channel using information indicative of an activity level. Then, an equalizer is constructed using the reconstructed interference covariance matrix.

Figure 6:
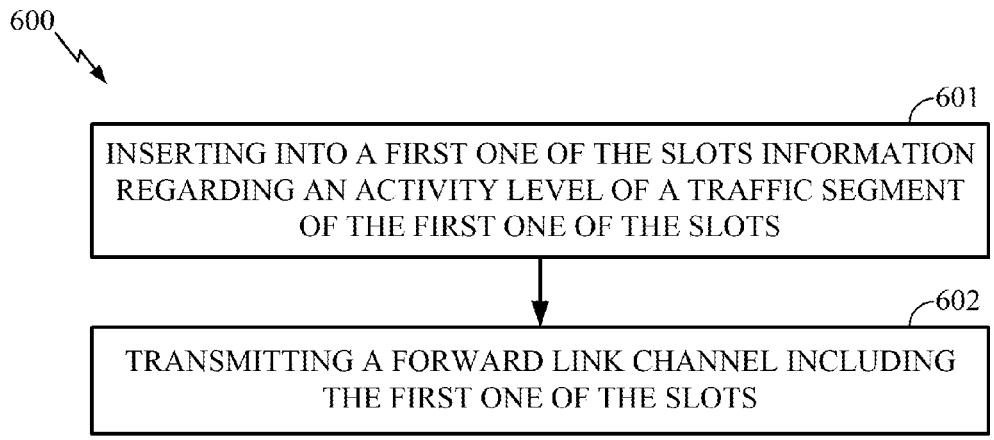
FIG. 6 is an illustration of an exemplary method adapted according to one embodiment of the disclosure.

FIG. 6 is an illustration of an exemplary method 600 adapted according to one embodiment of the disclosure. The method 600 may be performed, for example, by a base station that transmits forward link signals in one or more sectors to one or more access terminals. The forward link signals are transmitted slot-by-slot, where some of the slots are idle with respect to traffic, and others are active with respect to traffic.

In block 601, information regarding an activity level of a traffic segment of the first one of the slots is inserted into the first one of the slots. The information regarding an activity level may include a forward link activity bit, a preamble, and/or the like.

In block 602, a forward link signal is transmitted. The forward link signal includes the first one of the slots, and can be transmitted on one or more sectors. As explained above, an access terminal uses the information in the slot to calculate interference.

Figure 7:
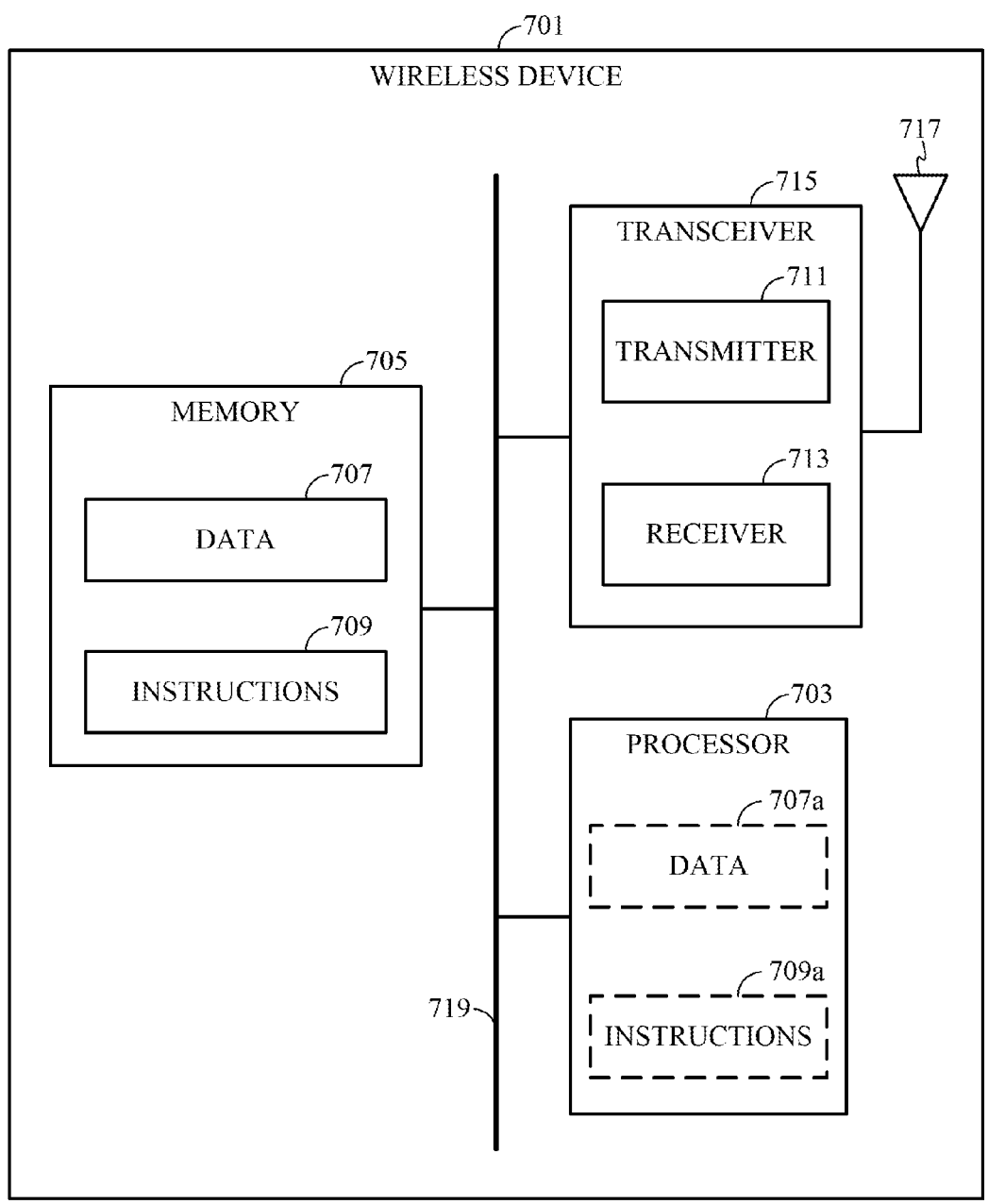
FIG. 7 illustrates certain components that may be included within a wireless device.

FIG. 7 illustrates certain components that may be included within a wireless device 701. The wireless device 701 may be an access terminal or a base station. Examples of access terminals include cellular phones, handheld wireless devices, wireless modems, laptop computers, personal computers, etc. An access terminal may alternatively be referred to as a user equipment, a mobile terminal, a subscriber station, a remote station, a user terminal, a terminal, a subscriber unit, a mobile device, etc.

The wireless device 701 includes a processor 703. The processor 703 may be a general purpose single- or multi-chip microprocessor (e.g., an ARM), a special purpose microprocessor (e.g., a digital signal processor (DSP)), a microcontroller, a programmable gate array, etc. The processor 703 may be referred to as a central processing unit (CPU). Although just a single processor 703 is shown in the wireless device 701 of FIG. 7, in an alternative configuration, a combination of processors (e.g., an ARM and DSP) may be used in some embodiments.

The wireless device 701 also includes memory 705. The memory 705 may be any electronic component capable of storing electronic information. The memory 705 may be embodied as random access memory (RAM), read only memory (ROM), magnetic disk storage media, optical storage media, flash memory devices in RAM, onboard memory included with the processor, EPROM memory, EEPROM memory, registers, and so forth, including combinations thereof.

Data 707 and instructions 709 may be stored in the memory 705. The instructions 709 may be executable by the processor 703 to implement the methods disclosed herein. Executing the instructions 709 may involve the use of the data 707 that is stored in the memory 705. When the processor 703 executes the instructions 709, various portions of the instructions 709a may be loaded onto the processor 703, and various pieces of data 707a may be loaded onto the processor 703.

The wireless device 701 may also include a transmitter 711 and a receiver 713 to allow transmission and reception of signals to and from the wireless device 701. The transmitter 711 and receiver 713 may be collectively referred to as a transceiver 715. An antenna 717 may be electrically coupled to the transceiver 715. The wireless device 701 may also include (not shown) multiple transmitters, multiple receivers, multiple transceivers and/or multiple antenna.

The various components of the wireless device 701 may be coupled together by one or more buses, which may include a power bus, a control signal bus, a status signal bus, a data bus, etc. For the sake of clarity, the various buses are illustrated in FIG. 7 as a bus system 719.

The processor of FIG. 7 is not limited to any particular processor and may include, e.g., a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The memory of FIG. 7 is not limited to any particular memory and may include various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

Various embodiments herein, such as the embodiments illustrated in FIGS. 5 and 6, may be performed by a processor-based device that executes computer-readable code or instructions. The functions described herein may be implemented in hardware, software, firmware, or any combination thereof. When implemented in software, the functions may be stored as one or more instructions on a computer-readable medium. Computer-readable media and computer program products can include any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are examples of transmission medium.

Further, it should be appreciated that modules and/or other appropriate means for performing the methods and techniques described herein, such as those illustrated by FIGS. 5 and 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for interference cancellation in a device that receives transmissions from a plurality of sources, the method comprising:

receiving a plurality of slots, each slot including a pilot segment and a traffic segment, a first one of the slots including information indicating that a traffic segment of the first one of the slots is idle, wherein the information indicating that the traffic segment of the first one of the slots is idle is selected from the list consisting of a forward activity bit, information added to a preamble, and a low-power signal comprising an Idle Mode Gain signal;

calculating a value associated with interference among the plurality of slots, utilizing the information indicating that the traffic segment is idle to account for an amount of interference attributable to the first one of the slots;

estimating channel conditions for a second one of the slots using the value associated with the amount of interference; and processing the second one of the slots according to the estimated channel conditions.

2. The method of claim 1 in which calculating a value associated with interference among the plurality of slots comprises:

calculating interference among the plurality of slots using pilot segments of the plurality of slots, while disregarding a pilot segment of the first one of the slots in response to discerning the information indicating that the traffic segment is idle.

3. The method of claim 1 in which the transmissions comprise Orthogonal Frequency Division Multiplexing (OFDM) signals.

4. The method of claim 1 performed by a device selected from a group consisting of a music player, a video player, an entertainment unit, a navigation device, a communications device, a personal digital assistant (PDA), a fixed location data unit, and a computer.

5. An access terminal that receives transmissions from a plurality of sources, the access terminal comprising:

a first functional unit that receives a plurality of signals, each of the signals including a pilot segment and a traffic segment, a first one of the signals including information indicating that a traffic segment of the first one of the signals is idle, wherein the information indicating that the traffic segment of the first one of the signals is idle is selected from the list consisting of a forward activity bit, information added to a preamble, and a low-power signal comprising an Idle Mode Gain signal;

a second functional unit that estimates channel conditions for a second one of the signals by utilizing the information indicating that the traffic segment is idle to account for an amount of interference attributable to the first one of the signals; and a third functional unit that recovers information from the second one of the signals using the estimated channel conditions.

6. The access terminal of claim 5 in which the signals comprise Orthogonal Frequency Division Multiplexing (OFDM) slots.

7. The access terminal of claim 5 in which the second functional unit calculates interference using pilot segments of the plurality of signals and disregards the interference attributable to the first one of the signals when the traffic segment of the first one of the signals is indicated as idle.

8. A computer program product having a non-transitory computer readable medium tangibly recording computer program logic for interference cancellation in a device that receives transmissions from a plurality of sources, the computer program product comprising:

code that receives a plurality of slots, each of the slots including a pilot segment and a traffic segment, a first one of the slots including information indicating that a traffic segment of the first one of the slots is idle, wherein the information indicating that the traffic segment of the first one of the slots is idle is selected from the list consisting of a forward activity bit, information added to a preamble, and a low-power signal comprising an Idle Mode Gain signal;

code that calculates a value associated with interference among the plurality of slots, utilizing the information indicating that the traffic segment is idle to account for an amount of interference attributable to the first one of the slots;

code that estimates channel conditions for a second one of the slots using the value associated with the amount of interference; and code that processes the second one of the slots according to the estimated channel conditions.

9. The computer program product of claim 8 in which the code that calculates a value associated with interference among the plurality of slots comprises:

code that calculates interference using pilot segments of the plurality of slots; and code that disregards the interference attributable to the first one of the slots when the traffic segment of the first one of the slots is indicated as idle.

10. An access terminal that receives transmissions from a plurality of sources, the access terminal comprising:

means for receiving a plurality of signals, each of the signals including a pilot segment and a traffic segment, a first one of the signals including information indicating that a traffic segment of the first one of the signals is idle, wherein the information indicating that the traffic segment of the first one of the signals is idle is selected from the list consisting of a forward activity bit, information added to a preamble, and a low-power signal comprising an Idle Mode Gain signal;

means for estimating channel conditions for a second one of the signals by utilizing the information indicating that the traffic segment is idle to account for an amount of interference attributable to the first one of the signals; and means for recovering information from the second one of the signals using the estimated channel conditions.

11. A method for providing forward link transmissions, the method comprising:

transmitting a forward link signal slot-by-slot in which a first subset of the slots are active with respect to traffic and a second subset of the slots are idle with respect to traffic, the transmitting including:

inserting into a first one of the slots information indicating that a traffic segment of the first one of the slots is idle, wherein the information indicating that the traffic segment of the first one of the slots is idle is selected from the list consisting of a forward activity bit, information added to a preamble, and a low-power signal comprising an Idle Mode Gain signal.

12. The method of claim 11 in which the transmissions comprise Orthogonal Frequency Division Multiplexing (OFDM) transmissions.

13. A base station providing forward link transmissions, the base station comprising:

a functional unit transmitting a plurality of signals in a forward link in which some of the signals are active with respect to traffic and others of the signals are idle with respect to traffic, the functional unit inserting into a first one of the signals information indicating that a traffic segment of the first one of the signals is idle, wherein the information indicating that the traffic segment of the first one of the signals is idle is selected from the list consisting of a forward activity bit, information added to a preamble, and a low-power signal comprising an Idle Mode Gain signal.

14. A computer program product having a non-transitory computer readable medium tangibly recording computer program logic for providing forward link transmissions, the computer program product comprising:

code that transmits a forward link signal slot-by-slot in which a first subset of the slots are active with respect to traffic and a second subset of the slots are idle with respect to traffic, the code that transmits including:

code that inserts into a first one of the slots information indicating that a traffic segment of the first one of the slots is idle, wherein the information indicating that the traffic segment of the first one of the slots is idle is selected from the list consisting of a forward activity bit, information added to a preamble, and a low-power signal comprising an Idle Mode Gain signal.

15. The method of claim 1, further comprising reconstructing an interference covariance matrix for a desired traffic channel utilizing the information indicating that the traffic segment is idle.

* * * * *